July 8, 1941.　　　　G. MAFERA　　　　2,248,715

ALIGNER

Filed June 13, 1940

Inventor
Guy Mafera
Spear, Rawlings & Spear
Attorneys.

Patented July 8, 1941

2,248,715

UNITED STATES PATENT OFFICE 2,238,715

ALIGNER

Guy Mafera, Revere, Mass.

Application June 13, 1940, Serial No. 340,303

3 Claims. (Cl. 254—104)

My present invention relates to a novel aligner for adjustably supporting a heavy object correctly regardless of the slope of the supporting surface or the desired relation of the object thereto.

The installation of heavy machinery or other equipment generally requires its careful alinement. As the condition of the supporting surface or the desired relation of the object thereto are variable factors, it is my concept that the correct support of the heavy objects requires an aligner in which the top and bottom surfaces may be brought into non-parallel relation.

In accordance with my invention, I accomplish this result by forming one of the pair of wedge members, by which the overall thickness of the aligners is varied, and a second member, with complemental surfaces, one concave and the other convex for mutual contact, so that a constant bearing area is maintained during limited universal relative adjustments of the two members. By this construction, the supporting surfaces of the aligners may be brought into a non-parallel relation as determined by the slope of the floor and the desired relation of the object thereto.

In the drawing, I have shown an embodiment of my invention from which its general novel features and advantages will be readily apparent. In the drawing.

Figure 1:
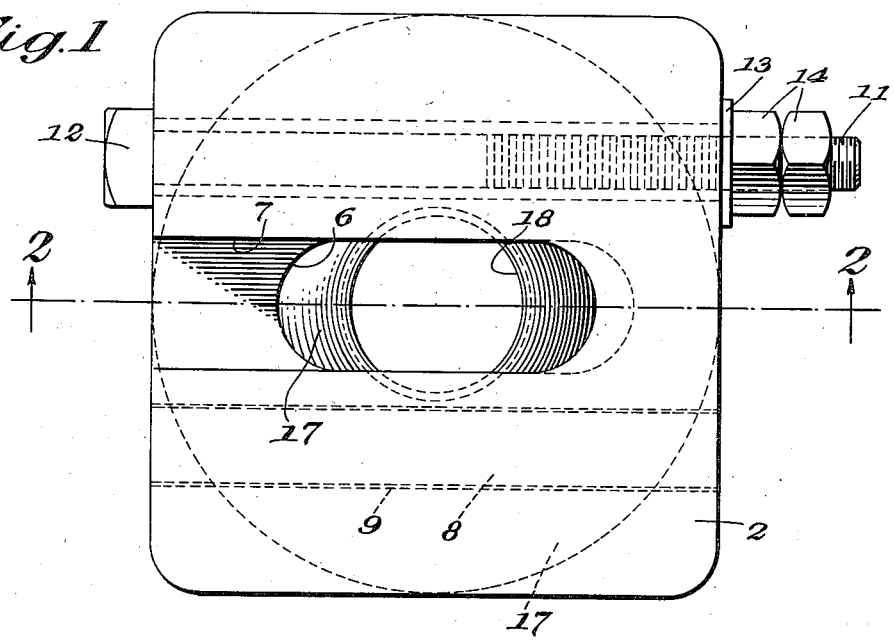
Fig. 1 is a plan view of an aligner in accordance with my invention.

Aligners in accordance with my present invention consist of a first wedge member 1 and a second wedge member 2. The wedge members 1 and 2 have inclined surfaces 3 so that when the wedge members are reversed and assembled with the surfaces 3 in mutual contact the margins of the bottom surface 4 of the member 1 and the top surface 5 of the member 2 are in parallel and separated by a distance determined by the position of the member 2 relative to the member 1 (see Fig. 2.)

The first wedge member 1 has a centrally disposed elongated slot 6 in registry with the open-ended slot 7 in the second wedge member 2. The slots 6 and 7 receive the attaching bolt (not shown) and permit the wedge members 1 and 2 to be moved relative thereto. Laterally of the slots 6 and 7, the member 2 is formed with a tongue or rib 8 to enter, on assembly, the groove 9 in the first wedge member 1 when the wedge members are assembled.

On the opposite side of the slots 6 and 7, the members 1 and 2 are formed with channels 10 forming, on assembly of the aligner, an aperture having its top and bottom edges in parallel. This aperture is for the adjusting bolt 11, the head 12 of which bears against the end of the member 1. The bolt 11 is provided at its opposite end with a washer 13 and nuts 14 to contact the end of the member 2 so that the members 1 and 2 may be adjusted relative to each other to establish a desired aligner thickness and securely locked in an adjusted position. The washer 13 may be square and of a size to ride on the surface 3 on opposite sides of the channel 10 in the wedge member 1 to hold the bolt 12 in such position that the nuts 14 may be readily engaged and rotated.

My aligner, as thus far described, is generally similar to aligners of the type shown in my United States Letters Patent No. 2,123,484, of July 12, 1938. In accordance with my present invention, the first wedge member 1 is formed with a concave recess 15 in its surface 4 to receive complemental convex bearing portions 16 of the leveling plate 17.

The leveling plate 17 is formed with a centrally disposed aperture 18 for the attaching bolt by which the object is anchored to the floor or other supporting surface. The aperture 18 tapers towards the top and its smallest diameter is greater than the width of the slots 6 and 7.

Figure 2:
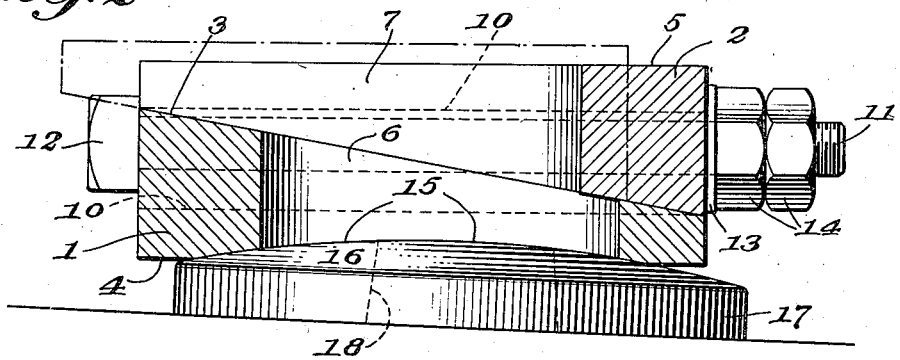
Fig. 2 is a partly sectioned side view of the aligner shown in Fig. 1.
Figure 3:
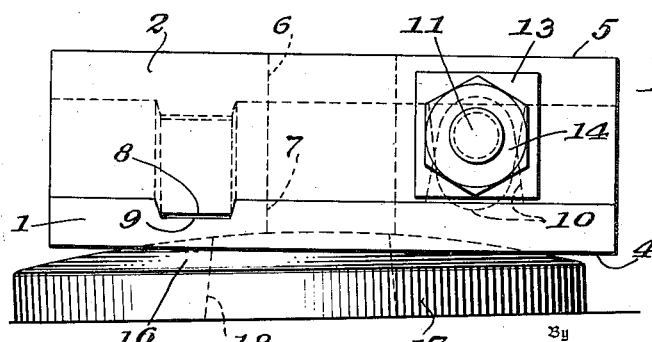
Fig. 3 shows the aligner in end view.

While I have shown the leveling plate 17 as the bottom or base of my aligner, the aligner may obviously be reversed so that the leveling plate establishes its top surface. With the assembly shown in the drawing, the aperture 18 of the leveling plate 17 may be positioned where desired. The assembled wedge members may then be adjusted relative thereto to bring the top aligner surface 5 into a desired plane as shown in Figs. 2 and 3 and the wedge members adjusted to establish an aligner of thickness to support the object in its desired position as indicated by the dotted line position of the member 2 in Fig. 2.

In the leveling adjustment of the aligner, it will be apparent that the size and shape of the aperture 18 permits it to be aligned with the aperture defined by the slots 6 and 7 of the assembled wedge members during limited universal relative adjustment of the wedge members and the leveling plate so that the attaching bolt may be accommodated.

With aligners incorporating this feature, the desired relation of the supporting plane of the aligner to the plane of the supporting surface may be readily established without interference with the necessary vertical adjustments and without any loss in bearing area between the top plate 17 and the second wedge member 2.

What I therefore claim and desire to secure by Letters Patent is:

1. An aligner for adjustably supporting a heavy object in desired position relative to a supporting surface, said aligner comprising superimposed first and second wedge members having top and bottom surfaces and having their mutually contacting surfaces inclined to maintain said top and bottom surfaces in parallel, adjusting means in engagement with each of said members to effect relative movement therebetween to vary the overall thickness of the aligner as desired, and a leveling member in contact with one of said wedge members and having a face for contact with said supporting surface or the object to be supported, one of the contacting surfaces of said last named members being spherically concave and the other of said surfaces being convex to establish complemental portions providing an adequate bearing during limited universal relative adjustment of said leveling member and said wedge member to bring the object supporting surface of said aligner into a desired plane said leveling member having a central aperture axially of its spherical complemental portion and adapted to receive a vertical object contacting bolt for anchoring the object in its adjusted position relative to said plane.

2. An aligner as in claim 1, in which the central aperture of the leveling member has tapered lateral walls inclined to the axis of the spherical complemental surface of the leveling member.

3. The aligner of claim 1, said wedge members having bolt-receiving apertures to register with each other and with the bolt receiving aperture in said leveling member, the apertures of said wedge members being of greater length but of less width than the diameter of the aperture of said leveling member so that the wedge members may have limited longitudinal movement relative to each other and limited universal movement as a unit on said leveling member relative to said bolt.

GUY MAFERA.